US006360542B1

(12) United States Patent
Luo

(10) Patent No.: US 6,360,542 B1
(45) Date of Patent: Mar. 26, 2002

(54) APPARATUS FOR CONVERTING SOLAR ENERGY INTO ELECTRICAL ENERGY

(75) Inventor: Chin-Kuang Luo, Taichung (TW)

(73) Assignee: Orra Corporation, Santa Clara, CA (US)

( * ) Notice: Subject to any disclaimer, the term of this patent is extended or adjusted under 35 U.S.C. 154(b) by 0 days.

(21) Appl. No.: 09/735,121

(22) Filed: Dec. 12, 2000

(51) Int. Cl.[7] ................................................. F03G 6/00
(52) U.S. Cl. ................................. 60/641.15; 60/641.8
(58) Field of Search .................... 60/641.8, 641.11, 60/641.15

(56) References Cited

U.S. PATENT DOCUMENTS

| 4,079,591 A | * | 3/1978 | Derby et al. | ............... 60/641.8 |
| 4,094,147 A | * | 6/1978 | Alleau et al. | ............... 60/641.8 |
| 4,408,459 A | * | 10/1983 | Yogev | ........................ 60/641.8 |
| 4,707,990 A | * | 11/1987 | Meijer | .................... 60/641.8 X |
| 4,982,569 A | * | 1/1991 | Bronicki | ..................... 60/641.8 |
| 5,005,360 A | * | 4/1991 | McMurtry | .................. 60/641.8 |

\* cited by examiner

*Primary Examiner*—Hoang Nguyen
(74) *Attorney, Agent, or Firm*—Trop, Pruner & Hu, P.C.

(57) ABSTRACT

An apparatus for converting solar energy into electrical energy includes a solar energy collecting device for collecting light energy from the sun, and a tank for holding water therein. The tank is held in place with respect to the solar energy collecting device to enable the solar energy collecting device to direct the light energy collected thereby to the tank, thereby increasing temperature of the tank for converting the water in the tank into steam. A steam turbine and generator assembly is coupled to the tank, and receives the steam from the tank to generate electrical energy.

10 Claims, 3 Drawing Sheets

APPARATUS FOR CONVERTING SOLAR ENERGY INTO ELECTRICAL ENERGY

BACKGROUND OF THE INVENTION

1. Field of the Invention

This invention relates to an apparatus for converting solar energy into electrical energy, more particularly to an apparatus which can direct light energy collected by a solar energy collecting device from the sun to a tank for converting water in the tank into steam and that is subsequently used to generate electrical energy.

2. Description of the Related Art

While solar cells are available in the art for converting solar energy into electric energy, they are not suited for generating a high electrical power output and are costly to implement.

SUMMARY OF THE INVENTION

The object of the present invention is to provide an apparatus which can collect solar energy to convert water in a tank into steam that is further converted into electrical energy.

According to this invention, the apparatus for converting solar energy into electrical energy includes a solar energy collecting device for collecting light energy from the sun, and a tank for holding water therein. The tank is held in place with respect to the solar energy collecting device to enable the solar energy collecting device to direct the light energy collected thereby to the tank, thereby increasing temperature of the tank for converting the water in the tank into steam. A steam turbine is coupled to the tank, and receives the steam from the tank to produce a mechanical rotary motion from energy of the steam. An electric power generator is coupled to the steam turbine for converting the mechanical rotary motion into electrical energy.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
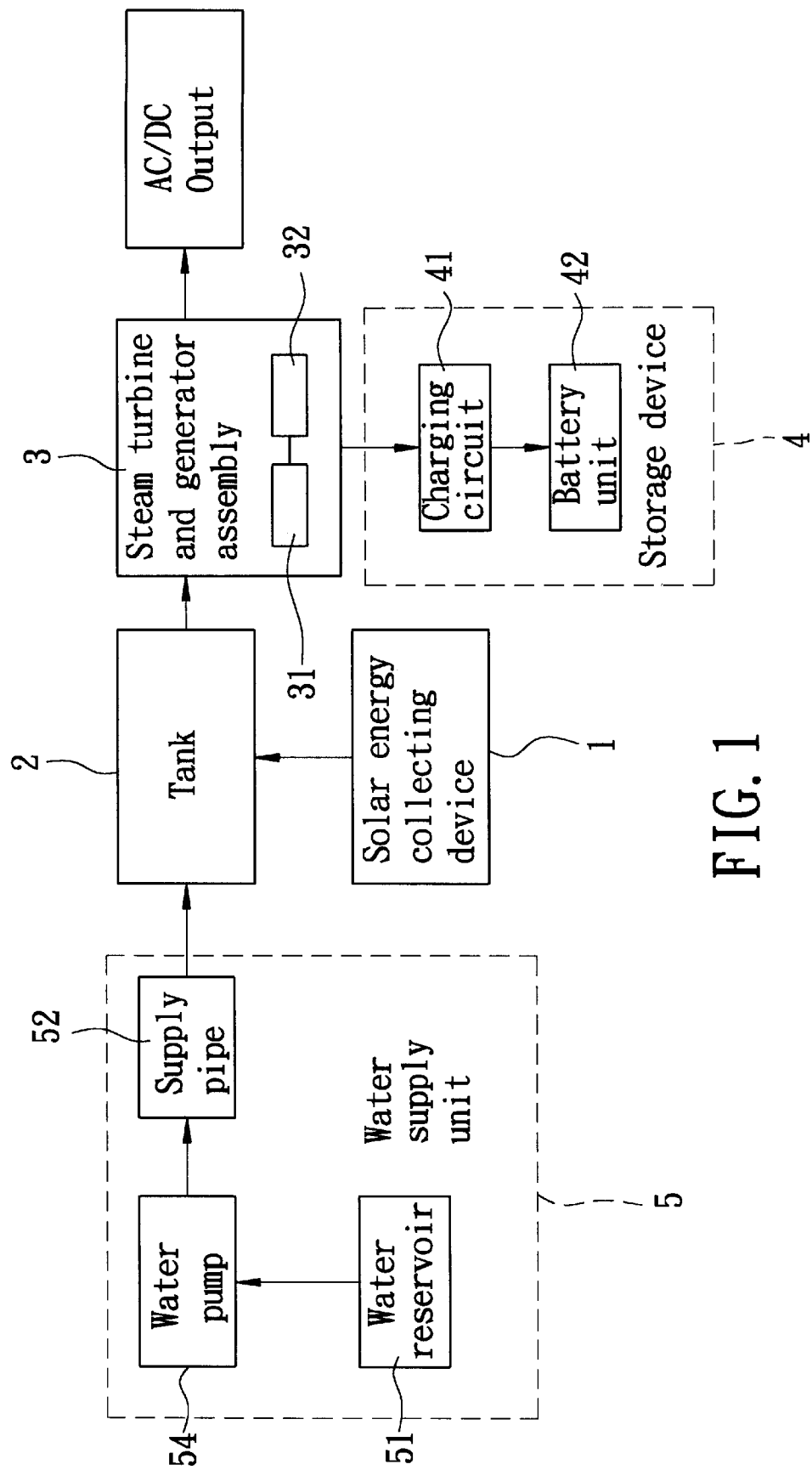
FIG. 1 is a schematic block diagram of an apparatus for converting solar energy into electrical energy according to this invention.

Referring to FIG. 1, the preferred embodiment of the apparatus according to the present invention is shown to comprise a solar energy collecting device 1 for collecting light energy from the sun, a water supply unit 5, a tank 2, a steam turbine and generator assembly 3, and a storage device 4.

Figure 2:
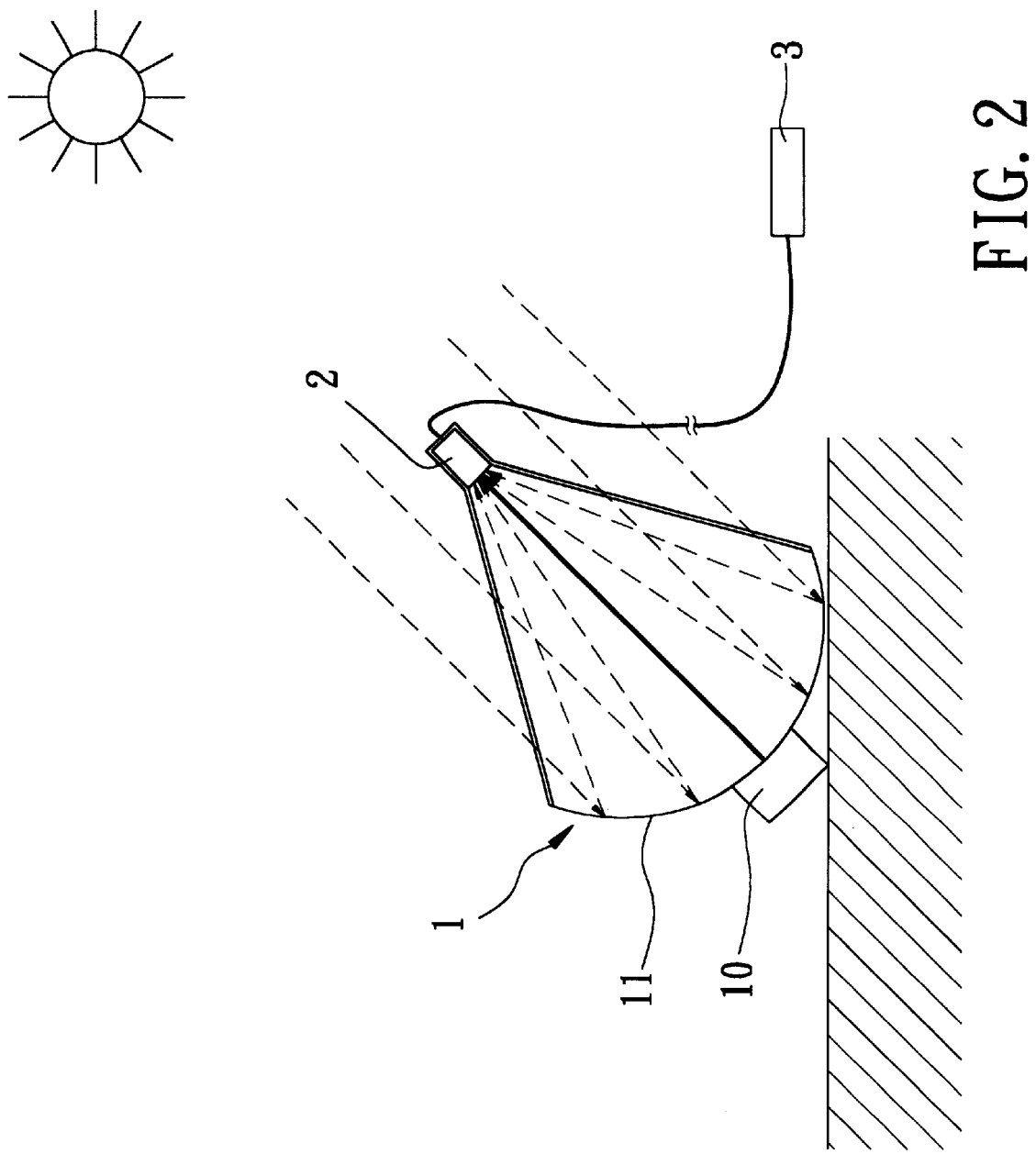
FIG. 2 is a schematic view of the apparatus in a state of use.

With reference to FIG. 2, the solar energy collecting device 1 includes a parabolic reflector 11 which is adapted to receive parallel rays of light from the sun and to reflect the parallel rays of light to a focal point, and a known servo control unit 10 for driving the parabolic reflector 11 to maintain constant alignment with the sun.

The water supply unit 5 includes a water reservoir 51, a supply pipe 52, and a water pump 54 which is coupled to the water reservoir 51 and the supply pipe 52.

The tank 2 is held in place at the focal point with respect to the parabolic reflector 11 to enable the solar energy collecting device 1 to direct the light energy collected thereby to a bottom portion of the tank 2, thereby increasing temperature of the tank 2 for converting water held in the tank 2 into steam. In this embodiment, the tank 2 moves with the parabolic reflector 11 that is driven by the servo control unit 10.

Figure 3:
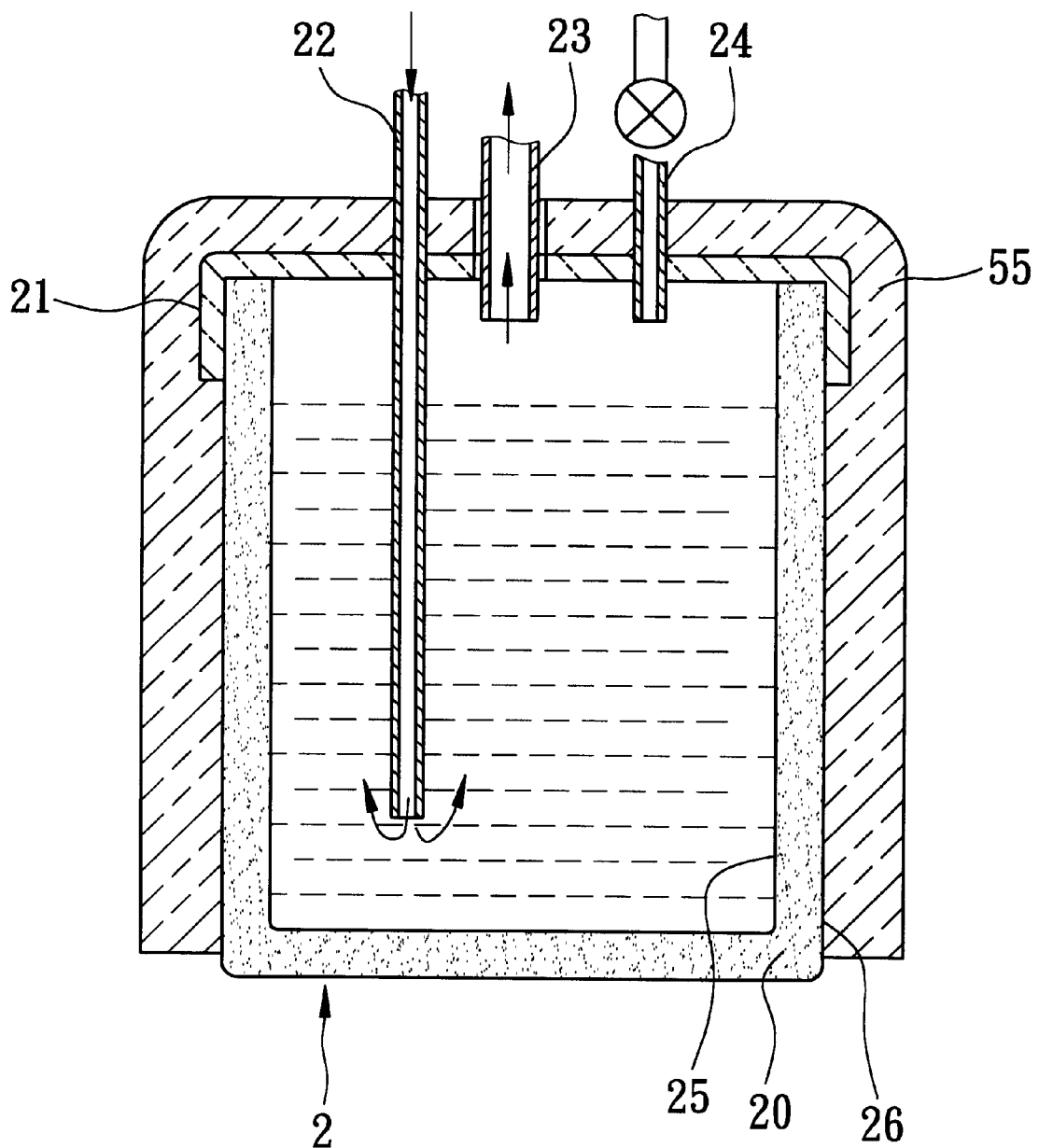
FIG. 3 is a partly sectional view of a tank of the apparatus of this invention.

With reference to FIG. 3, the tank 2 includes an inner tank layer 25, an outer tank layer 26 which cooperates with the inner tank layer 25 to form a chamber, and a superconductor material 20 which fills the chamber. In this embodiment, the superconductor material 20 is an inorganic superconductor in powder form to adhere to the vacuum interior of the chamber. The superconductor material 20 has an applicable temperature range (no change in physical state) of about −50° C. to 1700° C., and is a non-radioactive material. A lid 21, which is made of carbon steel, is disposed to cover sealingly an open top portion of the tank 2. The lid 21 is provided with a water inlet 22 which is coupled to the supply pipe 52 of the water supply unit 5, a steam outlet 23 and a pressure relief valve 24. In addition, a heat insulation layer 55 is wrapped around a surrounding wall portion of the outer tank layer 26. It is noted that a ratio of size of the parabolic reflector 11 to the tank 2 is sufficiently large to allow the parabolic reflector 11 to receive a large amount of the light energy from the sun with minimal blocking by the tank 2, and to allow the light energy directed by the parabolic reflector 11 to converge at a relatively small bottom portion of the tank 2, thereby enhancing conversion of water into steam.

Preferably, the tank 2, which is small in size, has a small water holding capacity (such as about 1000 cc–3000 cc), and the temperature in the tank 2 is preferably kept above 500° C. so that the water entering into the tank 2 can be effectively converted.

Preferably, the water can be pre-heated to a temperature of about 70–90° C. in the water supply unit 5 before entering the tank 2. For example, the water reservoir 51 can be exposed to the sunlight, and the supply pipe 52 can be disposed to surround the water reservoir 51.

The steam turbine and generator assembly 3 includes a steam turbine 31 and an electric power generator 32. The steam turbine 31 is coupled to the steam outlet 23 of the tank 2 to receive the steam from the tank 2 and to produce a mechanical rotary motion from energy of the steam in a known manner. The electric power generator 32 is coupled to the steam turbine 31 for converting the mechanical rotary motion into electrical energy. The electric power generator 32 may be an AC generator or a DC generator. The storage device 4 includes a battery unit 42, and a charging circuit 41 which interconnects the battery unit 42 and the electric power generator 32 so that the battery unit 42 can be charged by the electric energy from the generator 32. In a modification of the embodiment shown in FIG. 2, the steam turbine and generator assembly 3 can be disposed to move with the tank 2.

Preferably, the steam from the tank 2 can be collected in a steam collecting tank (not shown) so as to control the pressure of steam that is supplied to the steam turbine and generator assembly 3.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. An apparatus for converting solar energy into electrical energy comprising:

a solar energy collecting device for collecting light energy from the sun;

a tank for holding water therein, said tank including an inner tank layer, an outer tank layer that cooperates with said inner tank layer to form a chamber, and a superconductor material that fills said chamber, said tank being held in place with respect to said solar energy collecting device to enable said solar energy collecting device to direct the light energy collected thereby to said tank, thereby increasing temperature of said tank for converting the water in said tank into steam;

a steam turbine coupled to said tank, said steam turbine receiving the steam from said tank and producing a mechanical rotary motion from energy of the steam; and, an electric power generator coupled to said steam turbine for converting the mechanical rotary motion into electrical energy.

2. The apparatus of claim 1, wherein said solar energy collecting device includes a parabolic reflector adapted to receive parallel rays of light from the sun, and to reflect the parallel rays of light to a focal point, said tank being held in place at said focal point with respect to said parabolic reflector.

3. The apparatus of claim 2, wherein said solar energy collecting device further includes a servo control unit for driving said parabolic reflector to maintain constant alignment with the sun.

4. The apparatus of claim 2, wherein ratio of size of said parabolic reflector to said tank is sufficiently large to allow said parabolic reflector to receive a large amount of the light energy from the sun with minimal blocking by said tank, and to allow the light energy directed by said parabolic reflector to converge at a relatively small bottom portion of said tank, thereby enhancing conversion of water into steam.

5. The apparatus of claim 1, wherein said solar energy collecting device directs the light energy collected thereby to a bottom portion of said tank.

6. The apparatus of claim 1, wherein said tank includes an inner tank layer, an outer tank layer that cooperates with said inner tank layer to form a chamber, and a superconductor material that fills said chamber.

7. The apparatus of claim 1, wherein said tank further includes a heat insulation layer wrapped around a surrounding wall portion of said outer tank layer.

8. The apparatus of claim 1, further comprising a water supply unit coupled to said tank and operable so as to supply pre-heated water into said tank.

9. The apparatus of claim 8, wherein said water supply unit includes:

a water reservoir;

a supply pipe coupled to said tank; and a water pump coupled to said water reservoir and said supply pipe.

10. The apparatus of claim 1, further comprising a storage device including a battery unit, and a charging circuit that interconnects said battery unit and said generator so that said battery unit can be charged by the electrical energy from said generator.

* * * * *